United States Patent
Bowers et al.

[19]

[11] Patent Number: 6,025,780
[45] Date of Patent: Feb. 15, 2000

[54] RFID TAGS WHICH ARE VIRTUALLY ACTIVATED AND/OR DEACTIVATED AND APPARATUS AND METHODS OF USING SAME IN AN ELECTRONIC SECURITY SYSTEM

[75] Inventors: John H. Bowers, Clarksburg, N.J.; Thomas J. Clare, Media, Pa.

[73] Assignee: Checkpoint Systems, Inc., Thorofare, N.J.

[21] Appl. No.: 08/900,266

[22] Filed: Jul. 25, 1997

[51] Int. Cl.[7] .................................................. G08B 13/14
[52] U.S. Cl. ................................ 340/572.3; 340/572.1; 340/825.54; 340/825.32; 705/28
[58] Field of Search ............................... 340/572, 825.32, 340/825.54, 572.1, 572.3; 364/478.03, 478.13, 478.15; 235/375, 382.5, 385; 705/28; 455/83

[56] References Cited

U.S. PATENT DOCUMENTS

| | | | |
|---|---|---|---|
| 3,752,960 | 8/1973 | Walton | 340/825.3 |
| 3,816,708 | 6/1974 | Walton | 340/825.3 |
| 4,141,078 | 2/1979 | Bridges, Jr. et al. | 235/375 |
| 4,223,830 | 9/1980 | Walton | 235/380 |
| 4,567,473 | 1/1986 | Lichtblau | 340/572 |
| 4,580,041 | 4/1986 | Walton | 235/380 |
| 4,688,026 | 8/1987 | Scribner et al. | 340/572 |
| 4,745,401 | 5/1988 | Montean | 340/572 |
| 4,746,830 | 5/1988 | Holland | 310/313 D |
| 4,827,395 | 5/1989 | Anders et al. | 364/138 |
| 4,837,568 | 6/1989 | Snaper | 340/825.54 |
| 4,857,893 | 8/1989 | Carroll | 340/572 |
| 4,881,061 | 11/1989 | Chambers | 340/563 |
| 4,924,210 | 5/1990 | Matsui et al. | 340/572 |
| 5,019,815 | 5/1991 | Lemelson et al. | 340/933 |
| 5,036,308 | 7/1991 | Fockens | 340/572 |
| 5,059,951 | 10/1991 | Kaltner | 340/572 |
| 5,099,226 | 3/1992 | Andrews | 340/572 |
| 5,099,227 | 3/1992 | Geiszler et al. | 340/572 |
| 5,103,222 | 4/1992 | Esch et al. | 340/825.54 |
| 5,111,186 | 5/1992 | Narlow et al. | 340/572 |
| 5,119,070 | 6/1992 | Matsumoto et al. | 340/572 |
| 5,151,684 | 9/1992 | Johnsen | 340/572 |
| 5,153,842 | 10/1992 | Dlugos, Sr. et al. | 364/478.15 |
| 5,214,409 | 5/1993 | Beigel | 340/572 |

(List continued on next page.)

FOREIGN PATENT DOCUMENTS

| | | |
|---|---|---|
| 0 494 114 | 7/1992 | European Pat. Off. . |
| 0 585 132 | 3/1994 | European Pat. Off. . |
| 0 598 624 | 5/1994 | European Pat. Off. . |
| 0 615 285 | 9/1994 | European Pat. Off. . |

OTHER PUBLICATIONS

Bowers, J. "Road To Intelligent Tagging is Paved with Opportunities," *Automatic I.D. News,* Oct. 1997, pp. 86–87.

*Primary Examiner*—Benjamin C. Lee
*Attorney, Agent, or Firm*—Akin, Gump, Strauss, Hauer & Feld, L.L.P.

[57] ABSTRACT

An electronic security system uses a set of predefined RFID tags. Each tag is associated with, and attached to, an article or packaging for an article. Each tag includes unique tag information which is logged into a computerized database that contains a record for each of the tags in the set. A detection zone is monitored with an interrogator which detects RFID tags. When an RFID tag is detected, the database records are compared to the tag information and an appropriate database response is output. A deactivation event may be performed on the tag when legitimate access is obtained to the tagged article. The deactivation event may be electronic, physical or virtual. One type of RFID tag used in the system may physically deactivated by altering the state of a circuit element associated with the tag so that the tag cannot return a response signal. Another type of RFID tag used in the system has electronically alterable tag information. The interrogator includes circuitry for detecting the electronic alteration and causing an appropriate response therefrom without requiring any communication with a database of tags.

24 Claims, 12 Drawing Sheets

U.S. PATENT DOCUMENTS

| | | | |
|---|---|---|---|
| 5,214,410 | 5/1993 | Verster | 340/572 |
| 5,218,343 | 6/1993 | Stobbe et al. | 340/572 |
| 5,260,690 | 11/1993 | Mann et al. | 340/572 |
| 5,288,980 | 2/1994 | Patel et al. | 235/381 |
| 5,339,074 | 8/1994 | Shindley et al. | 340/825.31 |
| 5,347,263 | 9/1994 | Carroll et al. | 340/572 |
| 5,353,011 | 10/1994 | Wheeler et al. | 340/572 |
| 5,430,441 | 7/1995 | Bickley et al. | 340/825.54 |
| 5,432,864 | 7/1995 | Lu et al. | 382/118 |
| 5,444,223 | 8/1995 | Blama | 235/435 |
| 5,446,447 | 8/1995 | Carney et al. | 340/572 |
| 5,448,110 | 9/1995 | Tuttle et al. | 257/723 |
| 5,450,070 | 9/1995 | Massar et al. | 340/825.35 |
| 5,450,492 | 9/1995 | Hook et al. | 380/28 |
| 5,469,363 | 11/1995 | Saliga | 364/478.13 |
| 5,471,203 | 11/1995 | Sasaki et al. | 340/825.31 |
| 5,490,079 | 2/1996 | Sharpe et al. | 705/418 |
| 5,497,140 | 3/1996 | Tuttle | 342/51 |
| 5,499,017 | 3/1996 | Beigel | 340/572 |
| 5,519,381 | 5/1996 | Marsh et al. | 340/572 |
| 5,539,394 | 7/1996 | Cato et al. | 340/825.54 |
| 5,589,820 | 12/1996 | Robinson et al. | 340/572 |
| 5,604,486 | 2/1997 | Lauro et al. | 340/572 |
| 5,608,379 | 3/1997 | Narlow et al. | 340/572 |
| 5,710,540 | 1/1998 | Clement et al. | 340/572 |

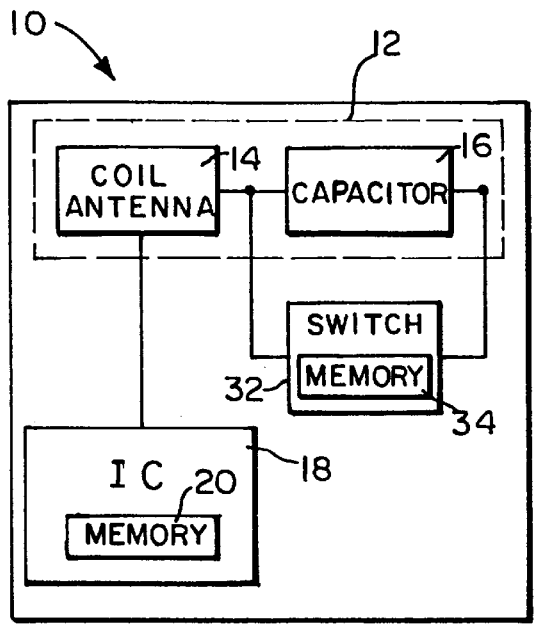
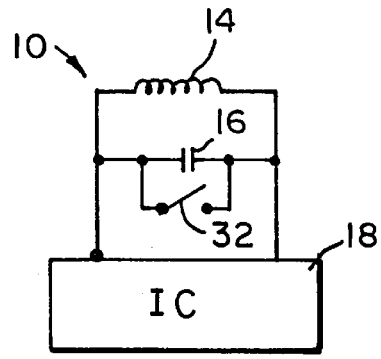
FIG. 7A
FIG. 7B
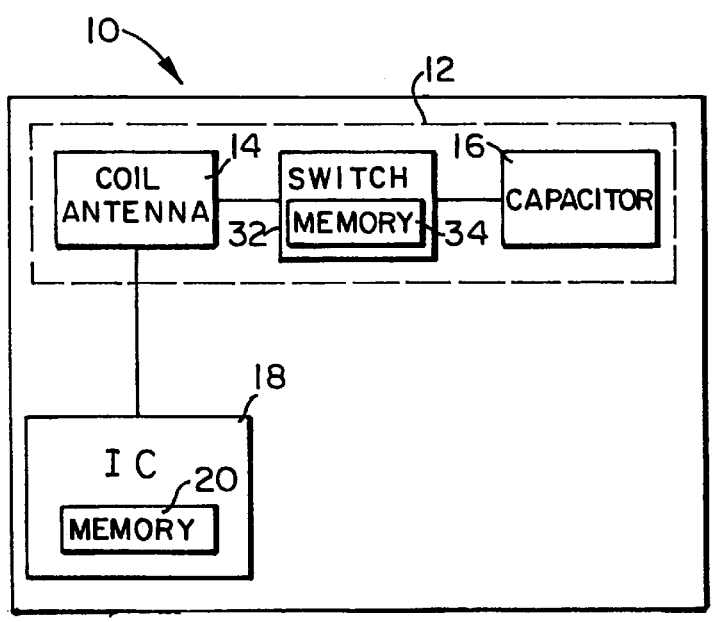
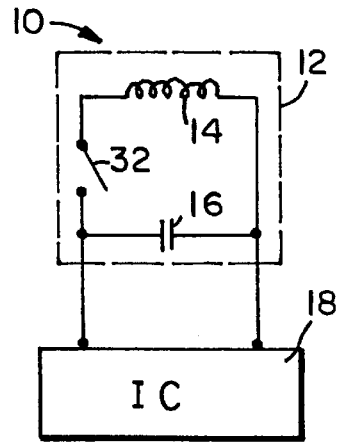
FIG. 7C
FIG. 7D

RFID TAGS WHICH ARE VIRTUALLY ACTIVATED AND/OR DEACTIVATED AND APPARATUS AND METHODS OF USING SAME IN AN ELECTRONIC SECURITY SYSTEM

BACKGROUND OF THE INVENTION

Electronic article security (EAS) systems for detecting and preventing theft or unauthorized removal of articles or goods from retail establishments and/or other facilities, such as libraries, have become widespread. In general, such security systems employ a security tag which is secured to or associated with an article (or its packaging), typically an article which is readily accessible to potential customers or facility users and, therefore, is susceptible to unauthorized removal. In general, such EAS systems are employed for detecting the presence (or the absence) of a security tag and, thus, a protected article within a surveilled security area or detection zone. In most cases, the detection zone is located at or around an exit or entrance to the facility or a portion of the facility.

One type of EAS system which has gained widespread popularity utilizes a security tag which includes a self-contained, passive resonant circuit in the form of a small, generally planar printed circuit which resonates at a predetermined detection frequency within a detection frequency range. A transmitter, which is also tuned to the detection frequency, is employed for transmitting electromagnetic energy or an interrogation signal into the detection zone. A receiver, tuned to the detection frequency, is positioned proximate to the detection zone. Typically, the transmitter and a transmitter antenna are located on one side of an exit or aisle and the receiver and a receiver antenna are located on the other side of the exit or aisle, so that a person must pass between the transmitter and receiver antennas in order to exit the facility. When an article having an attached security tag moves into or passes through the detection zone, the security tag is exposed to the transmitted energy (the security tag is interrogated), resulting in the resonant circuit of the tag resonating to provide an output signal detectable by the receiver. The detection of such an output signal by the receiver indicates the presence of an article with a security tag within the detection zone and the receiver activates an alarm to alert appropriate security or other personnel.

Existing EAS systems of the type described above and of other types have been shown to be effective in preventing the theft or unauthorized removal of articles.

Security tags of the type described used in a particular store or chain of stores are typically identical. Thus, all articles, regardless of size or value, which include the securi:y tag return an identical signal to the receiver. Recently, passive resonant security tags which return unique or semi-unique identification codes were developed. U.S. Pat. No. 5,446,447 (Carney et al.), U.S. Pat. No. 5,430,441 (Bickley et al.), and U.S. Pat. No. 5,347,263 (Carroll et al.) disclose three examples of such security tags. These security tags typically include an integrated circuit to generate the identification code. Such "intelligent" security tags provide additional information about the article detected in the zone of the interrogator.

When it is desired to deactivate a security tag, such as when a tagged article is purchased, the usual approach with the prior art EAS systems is to physically deactivate or physically disable the security tag so that the tag does not respond to an interrogation signal sent out by the interrogator or transmitter when the tag passes through the detection zone. One common technique for physically deactivating a security tag is to destroy some portion of the resonant circuit, such as a capacitor. Another technique involves covering the tag with a shield on either a permanent or temporary basis to prevent the tag from being exposed to an interrogation signal. A third technique involves surrounding a portion of the tag coil with a magnetizable and demagnetizable metallic element which, according to whether the element is magnetized or demagnetized, changes the tag Q so that it becomes either detectable or undetectable by an interrogator.

Despite the widespread use of such security tags, and, more recently, RFID tags, there is still a need to expand the functional capabilities of EAS and other systems which use RFID tags. Specifically, it would be desirable to create databases which interact with interrogators and RFID programming equipment to identify and track the status of individually tagged articles. It would also be desirable to "deactivate" RFID tags in a manner which allows the tags to be conveniently reactivated. It would also be desirable to deactivate and reactivate RFID tags in a manner which does not require physically or electronically altering the tag itself. The present invention addresses these needs by providing a method of using deactivatable and reactivatable RFID tags which are tracked by a database so that the status of the tagged article may be tracked throughout its life cycle.

BRIEF SUMMARY OF THE INVENTION

An electronic security system is provided which comprises a predefined set of radio frequency identification tags, an interrogator, a computerized database containing a record for each of the tags in the set, and a computer which compares tag information obtained from the interrogator with the database records of tags. Each of the tags in the set includes an antenna and an integrated circuit. The antenna detects the presence of the article by receiving an interrogation signal and returning a response signal. The integrated circuit is connected to the antenna. The integrated circuit stores tag information and outputs the tag information with the response signal upon interrogation of the tag. Each tag is associated with, and attached to, an article or packaging for an article and is programmed with unique tag information. The interrogator monitors a detection zone for detecting disturbances in the form of a response signal caused by the presence of a tag within the zone. The interrogator outputs an interrogator output signal when a tag is detected in the zone. Each interrogator output signal includes the tag information stored in the integrated circuit. Each record in the computerized database includes tag information. The computer includes a comparator for receiving the database records and the tag information from the interrogator and comparing the database records to the tag information, and outputting an appropriate response.

Furthermore, a method is provided of using a predefined set of tags in an electronic RFID security system. Each tag is associated with, and attached to, an article or packaging for an article. Each tag includes an antenna for use in detecting the presence of the article by receiving an interrogation signal and returning a response signal, and an integrated circuit connected to the antenna for storing tag information and for outputting the tag information with the response signal upon interrogation of the tag. The method comprising the steps of programming each of the tags with unique tag information, establishing a computerized database containing a record for each of the tags in the set, each record including the tag information and other information about the article having the tag associated therewith, and monitoring a detection zone with an interrogator for detecting disturbances in the form of a response signal caused by the presence of a tag within the zone. The interrogator outputs an interrogator output signal when a tag is detected in the zone. Each interrogator output signal includes the tag information stored in the integrated circuit. The database records are then compared to the tag information and an appropriate database response is output. A deactivation event may be performed on the tag when legitimate access is obtained to the tagged article. The deactivation event may be electronic, physical or virtual.

Another embodiment of the invention provides a radio frequency identification tag comprising an antenna and an integrated circuit connected to the antenna. The antenna receives an interrogation signal and returns a response signal. The integrated circuit stores tag information and outputs the tag information with the response signal upon interrogation of the tag. The tag includes at least one circuit element that has a physically activated state which allows the tag to return a response signal, and a physically deactivated state which prevents the tag from returning a response signal.

Yet another embodiment of the invention provides an electronic security system comprising a predefined set of radio frequency identification tags and an interrogator. Each tag is associated with, and attached to, an article or packaging for an article. Each tag includes an antenna for detecting the presence of the article by receiving an interrogation signal and returning a response signal, and an integrated circuit connected to the antenna for storing tag information and for outputting the tag information with the response signal upon interrogation of the tag. The tag is programmed with unique tag information, and at least a portion of the tag information is electronically alterable so as to allow the tag to be electronically activated and deactivated. The interrogator monitors a detection zone and detects disturbances in the form of a response signal caused by the presence of a tag within the zone. The interrogator outputs an interrogator output signal when a tag is detected in the zone. Each interrogator output signal includes the tag information stored in the integrated circuit. The interrogator includes circuitry for detecting the electronically alterable portion of the tag information and determining an appropriate response therefrom.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7A is a block diagram schematic of a second embodiment of a physically reactivatable tag suitable for use with the present invention;

FIG. 7B is an equivalent electrical circuit diagram of one preferred implementation of the tag of FIG. 7A;

FIG. 7C is a block diagram schematic of a third embodiment of a physically reactivatable tag suitable for use with the present invention;

FIG. 7D is an equivalent electrical circuit diagram of one preferred implementation of the tag of FIG. 7C;

DETAILED DESCRIPTION OF THE INVENTION

Figure 1:
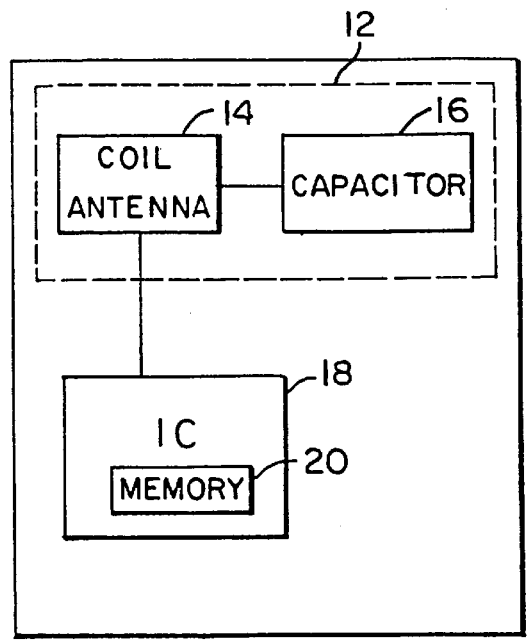
FIG. 1 is a block diagram schematic of an RFID tag suitable for use with the present invention.

Certain terminology is used herein for convenience only and is not be taken as a limitation on the present invention. In the drawings, the same reference numerals are employed for designating the same elements throughout the several figures.

FIG. 1 shows general details of a sample RFID tag 10 suitable for use with the present invention. The RFID tag 10 becomes an intelligent security tag when used in embodiments wherein the tag 10 is attached to articles. The tag 10 includes a passive resonant radio frequency (RF) circuit 12 for use in detecting when the tag 10 is within a zone monitored by a reader or interrogator, as is well-known in the art. One well-known type of circuit 12 has a coil antenna 14 and a capacitor 16 which together form a resonant circuit with a predetermined resonant frequency i.e., the selected radio frequency determined by the values of the coil and the capacitor. Power for the tag 10 is derived from the antenna 14 in a conventional manner. Furthermore, the tag 10 includes an integrated circuit (IC) 18 for providing "intelligence" to the tag 10. The IC 18 is electrically connected to the resonant circuit 12. (The capacitor 16 may be either external to the IC 18, or the capacitor 16 may be within the IC 18, depending upon the desired implementation of the circuit 12.) The IC 18 includes a programmable memory 20, such as a 20 bit memory, for storing bits of identification data. The IC 18 outputs a data stream comprised of the stored data (i.e. 20 bits in the present embodiment) when sufficient power from the antenna 14 is applied thereto. In one embodiment of the invention, the data stream creates a series of data pulses by switching an extra capacitor (not shown) across the coil antenna 14 for the duration of the data pulses. The addition of the extra capacitor changes the resonant frequency of the RF circuit 12, detuning it from the operational frequency. Thus, instead of the RF circuit 12 returning a simple single frequency response signal, it returns a signal containing a packet of preprogrammed information. The packet of information (data pulses) is received and processed by interrogator receiving circuitry and is decoded (if necessary) to provide identification information about an article to which the tag 10 is secured. Other methods of using the data in the IC memory 20 to output identification data from the tag 10 are within the scope of the invention. The IC 18 is preferably also a passive device and is powered in the same manner as the RF circuit 12 (i.e., by using energy received at the antenna 14 from the interrogator transmitter signal). The tag 10 is thus a so-called "radio frequency identification (RFID) tag" (RFID tag). Other types of RFID tags may be used with the present invention. Examples of other RFID tags which are suitable for use as the tag 10 are shown in U.S. Pat. No. 5,446,447 (Carney et al.), U.S. Pat. No. 5,430,441 (Bickley et al.), and U.S. Pat. No. 5,347,263 (Carroll et al.). Typically, RFID tags are not physically deactivatable. In other words, no physical change or change of magnetic state occurs to the state of the coil, capacitor or any other element comprising the antenna circuit of such RFID tags. An RFID tag which is not physically deactivatable has significant advantages over physically deactivatable magnetic security tags and/or prior art physically deactivatable RF security tags which are commonly used today because such RFID tags are more difficult to bypass. In some embodiments of the present invention, nonphysically deactivatable RFID tags are used. In other embodiments of the present invention, physically deactivatable RFID tags are used.

The preferred embodiment of the RFID tag includes a resonant circuit having a coil antenna and a capacitor, and an IC. However, the scope of the invention includes an RFID tag which has only a coil antenna and an IC.

Figure 2:
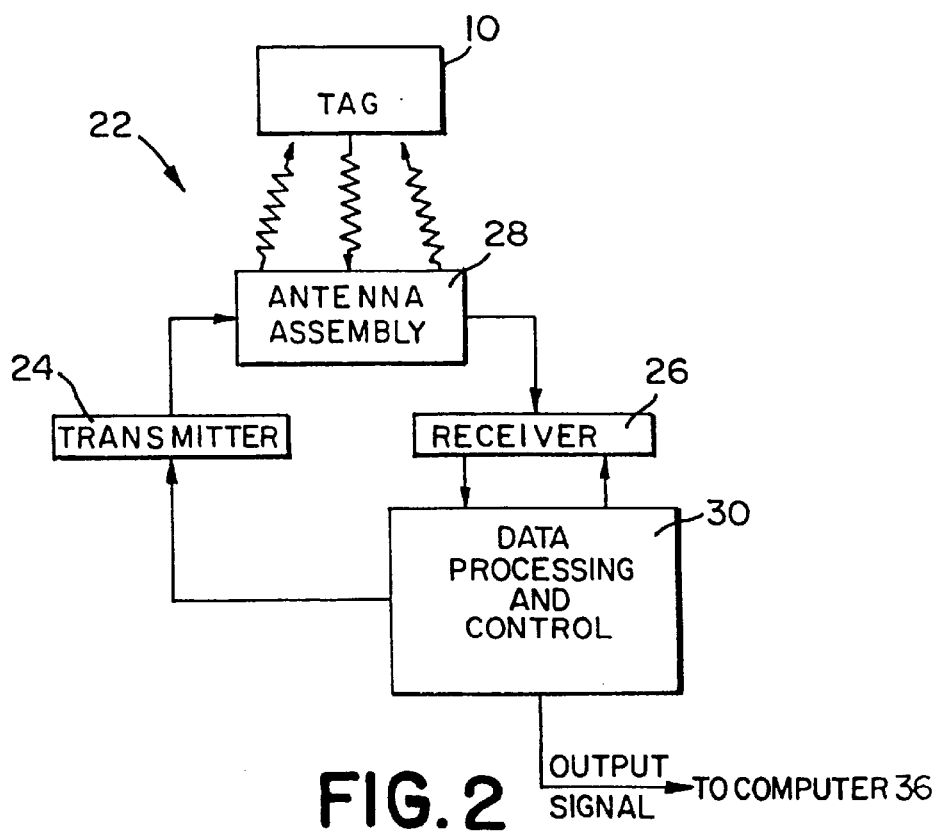
FIG. 2 is a functional block diagram schematic of an interrogator suitable for use with the present invention.

FIG. 2 is a block diagram schematic of a reader or interrogator 22 suitable for use with the tag 10 described in FIG. 2. The interrogator 22 and the tag 10 communicate by inductive coupling, as is well-known in the art. The interrogator 22 includes a transmitter 24, receiver 26, antenna assembly 28, and data processing and control circuitry 30, each having inputs and outputs. The output of the transmitter 24 is connected to a first input of the receiver 26, and to the input of the antenna assembly 28. The output of the antenna assembly 28 is connected to a second input of the receiver 26. A first and a second output of the data processing and control circuitry 30 are connected to the input of the transmitter 24 and to a third input of the receiver 26, respectively.

Furthermore, the output of the receiver 26 is connected to the input of the data processing and control circuitry 30. Interrogators having this general configuration may be built using circuitry described in U.S. Pat. Nos. 3,752,960, 3,816, 708, 4,223,830 and 4,580,041, all issued to Walton, all of which are incorporated by reference in their entirety herein. The interrogator 22 may be physically implemented, for example, as a pair of pedestals (not shown), a checkout pad, or as a portable RFID scanner (not shown), all of which are capable of communicating with RFID tags, depending upon the needs of the specific application.

Figures 3, 4:
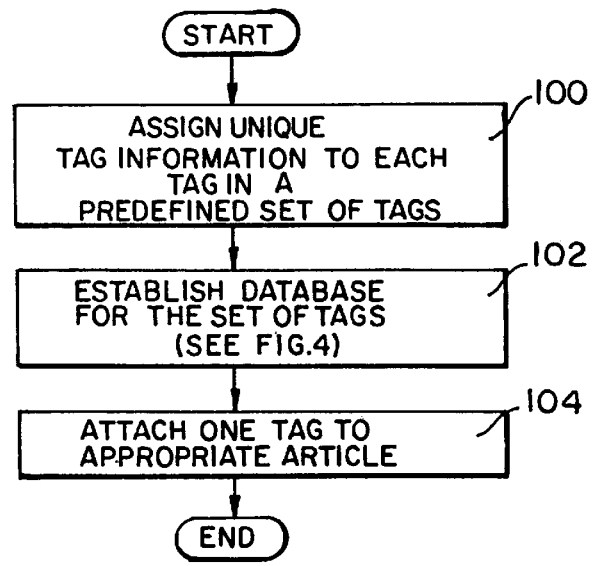
FIG. 3 is a flowchart of the steps for initiating a first embodiment of the present invention.
FIG. 4 is a sample database created for use with the first embodiment of the present invention.

FIG. 3 is a flowchart of the steps for initiating a first embodiment of the present invention, and FIG. 4 is a sample database created for use with the first embodiment. Referring to FIG. 3, a predefined set of tags 10 are prepared to be applied to a predefined set of articles (not shown), unique tag information is assigned to each tag 10 within the tag set and each of the tags are programmed accordingly using a tag programmer (step 100). This step includes assigning unique identification information and an initial status to each tag, as described in more detail below. Next, a database is established for the set of tags 10 (step 102). Lastly, one of the tags 10 is attached directly to each article or to the packaging of each article (step 104). In the disclosed embodiment, one tag 10 is associated with each article. Steps 100 and 102, or all three steps 100, 102 and 104, may be performed at a factory or at the site of article access. The steps in FIG. 3 may be performed in any order.

FIG. 4 shows a sample database 200 established in step 102 of FIG. 3. Each numbered record in the database 200 includes a field for tag information 202 comprising tag identification information 204 and variable information in the form of one or more status bits 206 (hereafter, "status bits"). Optionally, there may be additional fields for other information 208 pertaining to the record, such as article status 210 and article identification information 212. The tag information 202 is stored in the tag 10. Optionally, some or all of the other information 208 is also stored in the tag 10.

One example of tag information 202 is a serial number which is unique to the set of tags 10 in the database 200. Preferably, none of the serial numbers in the database 200 are used in dazabases or EAS systems of other entities which use tags 10 readable by the same interrogation equipment. In this manner, there is no chance that a tag used by another entity (e.g., another chain of stores) can be confused with any of the tags 10 in the database 200.

One example of article status 210 is a human readable string of characters indicating the meaning of the status bits. If the tagged articles are retail items, the article status 210 indicates whether the article is sold, unsold, returned or resold. If the tagged articles are books, videotapes, or other types of articles which are borrowed and returned, the article status 210 indicates whether the article is checked in or checked out, and may also indicate whether the article is or is not permitted to be removed from the premises. In the preferred embodiment of the invention, the article status 210 is a human readable form of the status bit(s) 206. If no article status field exists, the status bit(s) 206 may be decoded to obtain the article status information.

Article identification information 212 is a description of the article associated with the record in human readable form (e.g., SONY 19" TV, Model No. KV1926; PERT Shampoo/Conditioner, 16 oz.)

Once all of the articles are tagged and the database 200 is established, the articles are made accessible to customers or patrons within predefined surroundings. The predefined surroundings have one or more exits which have detection zones that are monitored with the interrogator 22 for detecting disturbances in the form of a response signal caused by the presence of a non-deactivated tag 10 within the zone. The interrogator 22 outputs an interrogator output signal when a non-physically deactivated tag 10 is detected in the zone. Each interrogator output signal includes the tag information 202 stored in the integrated circuit 18. The exit interrogation/tag interrogation process is described in more detail below with respect to FIGS. 9 and 10.

Figure 5:
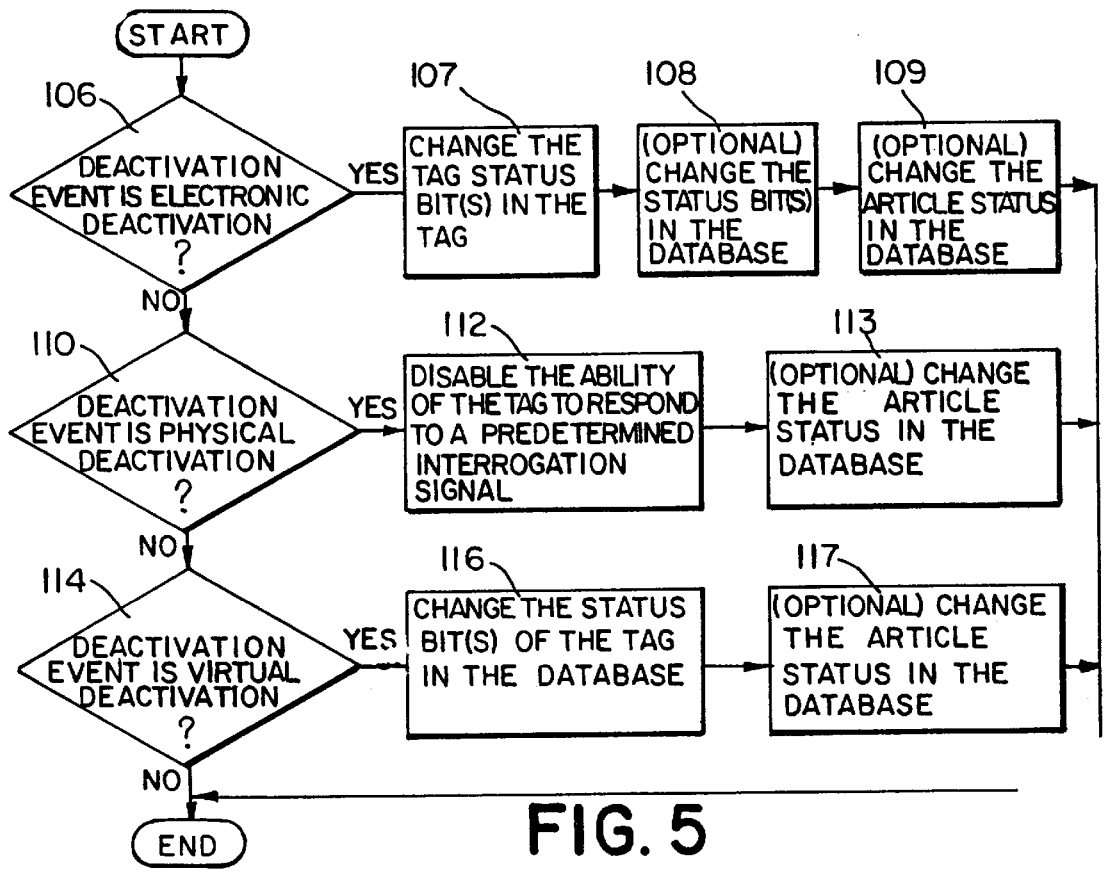
FIG. 5 is a flowchart of deactivation event options of "electronic deactivation," "physical deactivation," or "virtual deactivation," in accordance with the first embodiment of the present invention.

When legitimate access is obtained to an article having a tag 10 associated therewith, the tag 10 is deactivated before the tagged article can be removed from the predefined surroundings. FIG. 5 is a flowchart showing the various options associated with a deactivation event. Deactivation may be characterized as being either "electronic," "physical," or "virtual," as defined below:

electronic deactivation—one or more of the status bits in the tag 10 are electronically changed or reprogrammed, and, optionally, one or more of the security tag status bits 206 may be changed in the database 200. In the retail environment example shown in FIG. 4, the tag status bits could be changed from "01" to "00" to indicate that the article was sold. The electronic change can take place at the cash register or at a merchandise pick-up area by any suitable equipment. If the article is subsequently returned by the customer, the store could either change the tag status bits to another code, such as "10", until the article is further processed, or could change the status bits back to "01" if the article is immediately reshelved for subsequent purchase. The equipment for electronically changing or reprogramming the tag status bits may be the same or modified versions of the equipment (e.g., a tag programmer) used to initially program the tag information 202.

physical deactivation—the tag 10 is physically changed or disabled so that it does not output an interrogator output signal within the detection frequency range when passing through the detection zone (i.e., it does not respond to an interrogation signal sent out by the interrogator 22 or does not respond in a detectable manner). Tags 10 may be physically disabled in a reversible or nonreversible manner. A tag 10 may be non-reversibly disabled by destroying one cr more circuit elements or circuit connections within the tag 10 which are needed to either receive an interrogation signal or respond to an interrogation signal. One example is to break down the capacitor 16 of the resonant circuit 12, such as by using a dielectric breakdown mechanism, thereby creating a short across the capacitor 16 and preventing resonance of the tag 10. Alternatively, the tags 10 may be reversibly disabled. For example, referring to FIGS. 6A, 6B and 7A–7D, the tag 10 may include a built-in electronic switch 32 connected to the resonant circuit 12 in such a way as to disable the resonance, or receipt of the resonance, when the state of the switch 32 is changed.

Figure 6A:
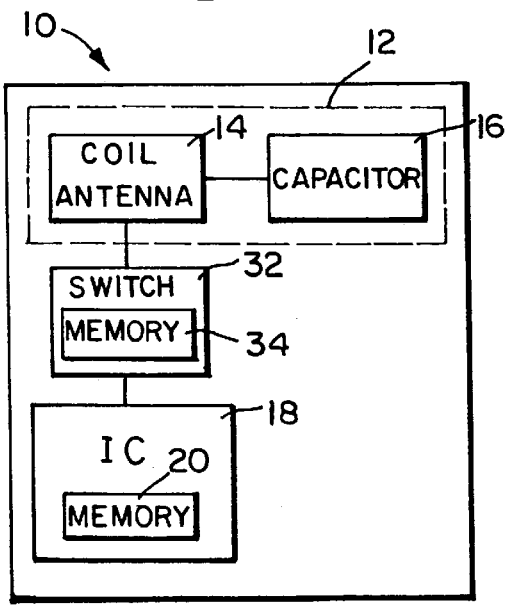
FIG. 6A is a block diagram schematic of a first embodiment of a physically reactivatable tag suitable for use with the present invention.
Figure 6B:
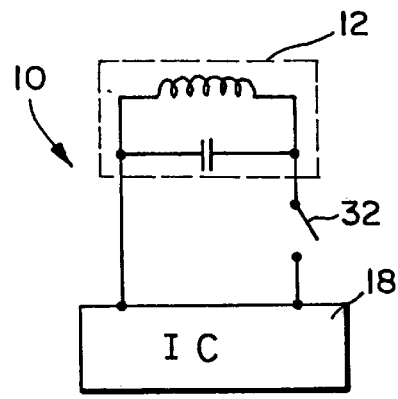
FIG. 6B is an equivalent electrical circuit diagram of one preferred implementation of the tag of FIG. 6A.

FIGS. 6A and 6B show a first embodiment of reversibly physically deactivatable tag 10 wherein the electronic switch 32 may be placed in series between the resonant circuit 12 and the IC 18 so that the resonant circuit 12 is disconnected when the switch 32 is open.

Alternatively, the switch 32 may be placed across the capacitor 16 or coil antenna so that resonance is prevented when the switch 32 is closed. FIGS. 7A and 7B show such an embodiment wherein the switch 32 is placed across the capacitor 16, thereby shorting out the capacitor 16 and preventing resonance.

FIGS. 7C and 7D show a third embodiment of a reversibly physically deactivatable tag 10 wherein the switch 32 is placed in the series loop of the resonant circuit 12. When the switch 32 is open, no resonance occurs. The tags in FIGS. 7A and 7C are preferred over the tag in FIG. 6A because there is less induced voltage impressed on the switch 32 in the tags of FIGS. 7A and 7C than in the tag in FIG. 6A.

The electronic switch 32 may be any suitable device, such as a Field Effect Transistor (FET). Preferably, the switch 32 has a memory 34 so that the state of the switch 32 is maintained whether or not power is applied to the tag 10. One example of such a switch 32 is an FET with a charge storage mechanism associated with its gate electrode, similar to that used in an EEPROM storage cell. The state of this switch may be changed using the same or modified versions of the equipment used to initially program the security tag information.

virtual deactivation—one or more of the tag status bits 206 are changed in the database 200, but no change is made to the status bits in the tag 10 nor is any other change made to the tag 10. The types of changes to the status bits 206 in the database 200 are the same as those described above with respect to the status bits in the tag 10. One advantage of virtual deactivation is that it is not necessary to use deactivatable or reprogrammable tags 10, or equipment to perform either function, in the EAS system.

FIG. 5 is a flowchart of the decision process for a deactivation event. If the deactivation event is electronic deactivation (YES output from step 106), one or more of the tag status bits are changed in the tag 10 (step 107), and, optionally, one or more of the tag status bits are changed in the database 200 (step 108). If an article status field exists in the database 200, the article status 210 is changed too (step 109). If the deactivation event is a physical deactivation (YES output from step 110), the tag 10 is physically disabled so that it does not respond to a predetermined interrogation signal (step 112) and the article status 210 is changed in the database 200 (step 113), if such a field exists. If the deactivation event is a virtual deactivation (YES output from step 114), the status bits 206 associated with the tag 10 are changed in the database 200 (step 116) and the article status 210 is also changed in the database 200 (step 117), if such a field exists.

It may sometimes be desired to reactivate a reversibly physically deactivated tag 10, or an electronically or virtually deactivated tag 10. (A non-reversibly physically deactivated tag 10 cannot be reactivated.) Reactivation is achieved by reversing the deactivation process.

Figure 8:
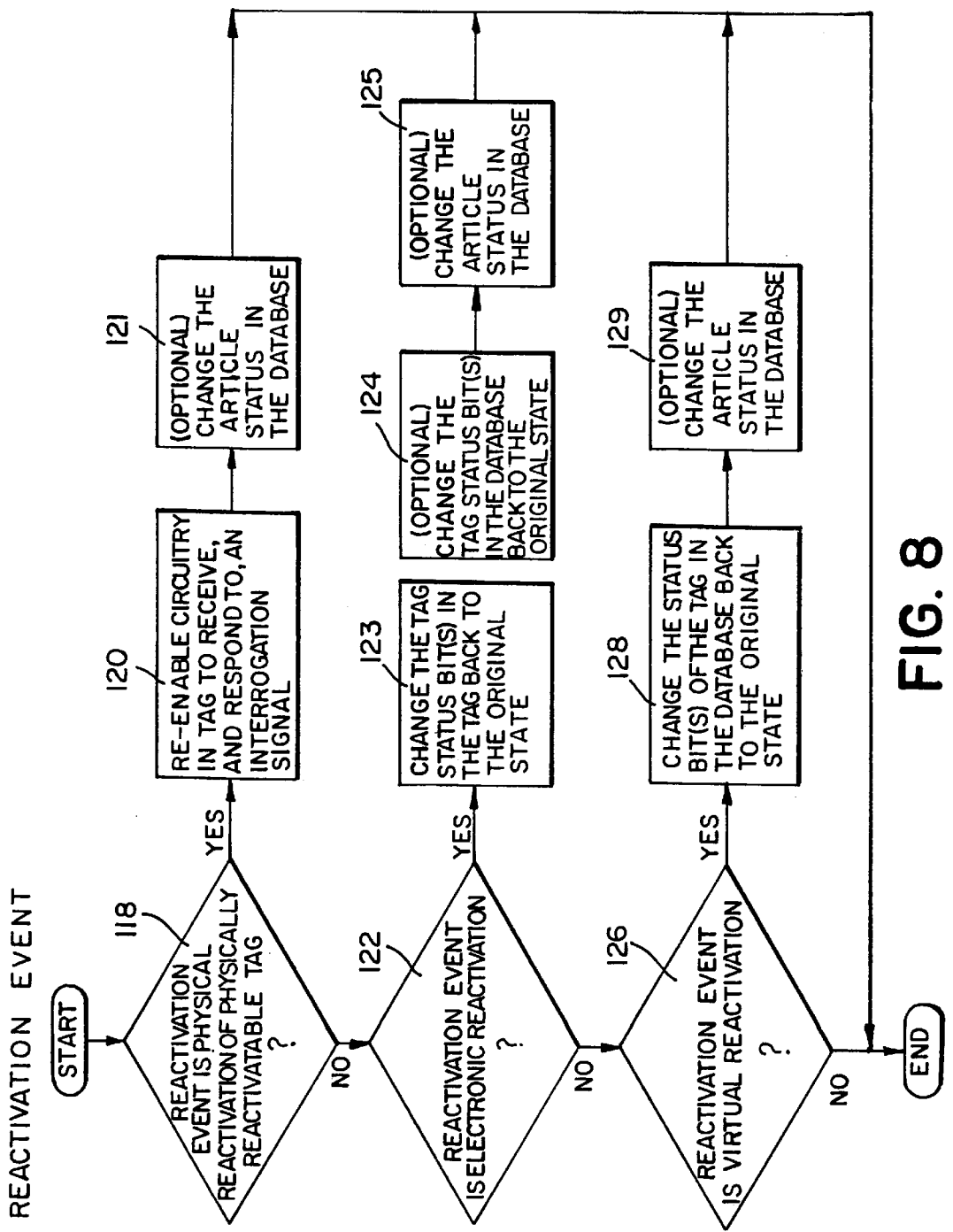
FIG. 8 is flowchart of the decision process for a reactivation event in accordance with the first embodiment of the present invention.

FIG. 8 is flowchart of the decision process for a reactivation event. If the reactivation event is a physical reactivation (YES output from step 118), the circuitry in the tag 10 which receives, and responds to, an interrogation signal is re-enabled (step 120), such as by changing the state of the electronic switch 32 back to its original state using suitable equipment, and the article status 210 is changed in the database 200 (step 121), if such a field exists. If the reactivation event is an electronic reactivation (YES output from step 122), the status bits in the tag 10 are changed back to their original state (step 123), and the article status 210 in the database 200 is changed back to its original state (step 125), if such a field exists. If the optional step 108 in FIG. 5 was performed during deactivation, then the status bits in the database 200 are changed back to their original state (step 124). If the reactivation event is a virtual reactivation (YES output from step 126), the status bits 206 associated with the tag 10 in the database 200 are changed back to their original state (step 128), and the article status 210 in the database 200 is changed back to its original state (step 129), if such a field exists. If the article contains a physically deactivated tag 10 which cannot be reactivated, a new tag 10 may be attached to the article and a new entry would be made in the database 200 for the new tag 10.

Figure 9:
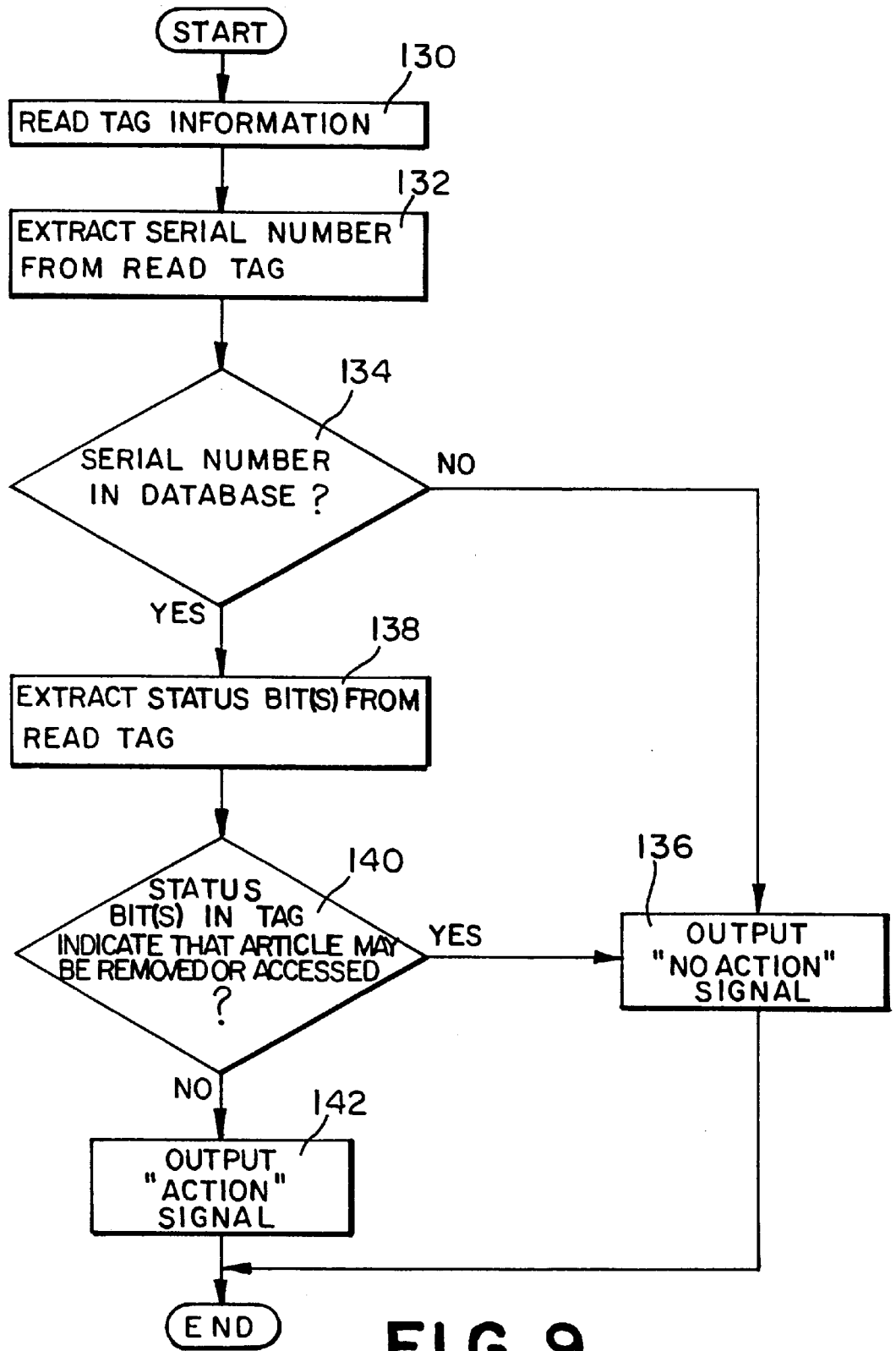
FIG. 9 is a flowchart of an exit interrogation/tag interrogation procedure useful for EAS systems which use electronic deactivation in accordance with the first embodiment of the present invention.
Figure 10:
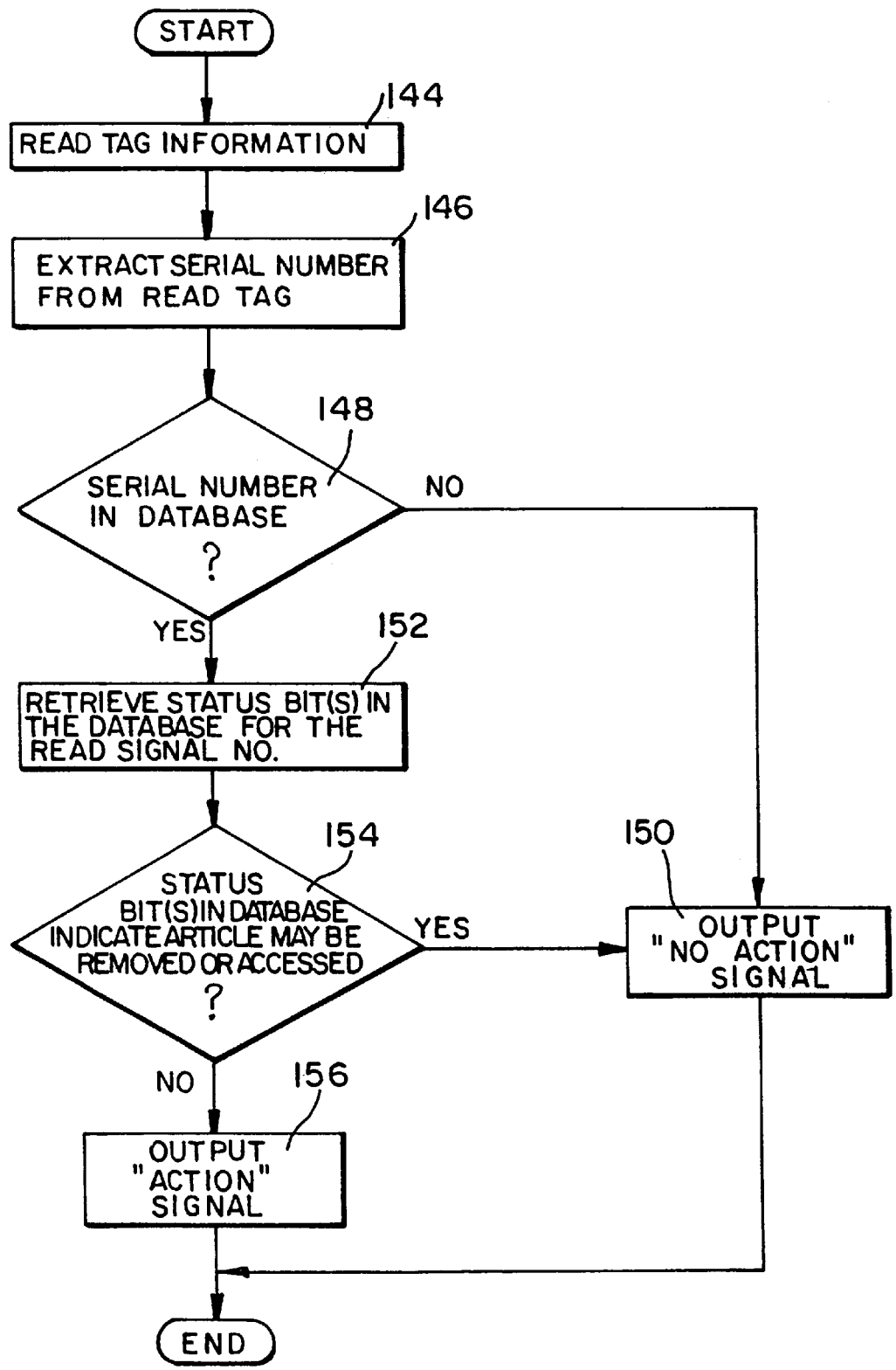
FIG. 10 is a flowchart of an exit interrogation/tag interrogation procedure useful for EAS systems which use virtual deactivation in accordance with the first embodiment of the present invention.
Figure 11:
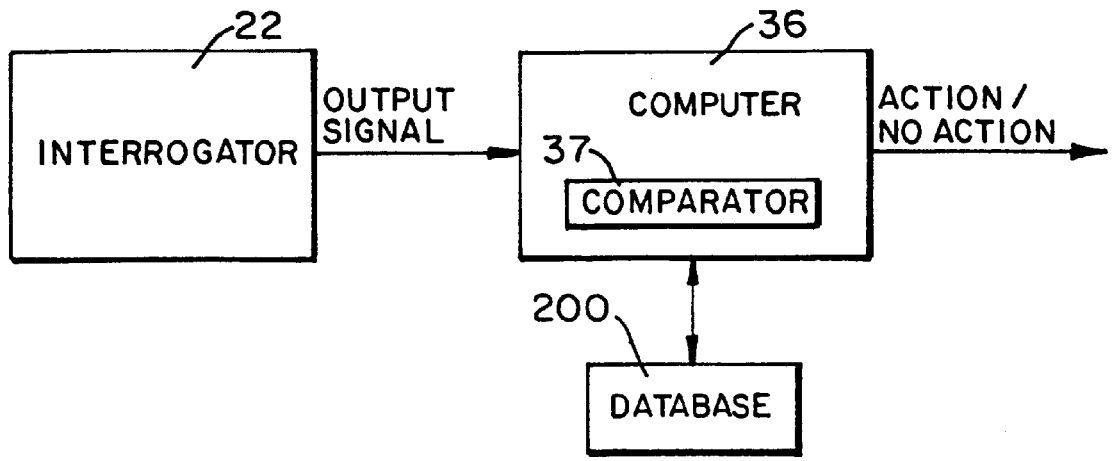
FIG. 11 is a schematic block diagram of the elements which perform the steps in FIGS. 9 and 10.

FIG. 9 is a flowchart of an exit interrogation/tag interrogation procedure useful for EAS systems which use electronic deactivation. FIG. 10 is a flowchart of an exit interrogation/tag interrogation procedure useful for EAS systems which use virtual deactivation. (If an EAS system uses physical deactivation, the tag 10 will not respond to an interrogation signal. Thus, the procedures in FIGS. 9 and 10 cannot be used for physically deactivated tags.) FIG. 11 is a schematic block diagram of the elements which perform the steps in FIGS. 9 and 10.

Referring to FIGS. 9 and 11, as the tagged article enters the detection zone, the article's tag 10 outputs a signal in response to an interrogation signal from the interrogator 22. Next, the interrogator 22 outputs a signal which contains the tag information and sends it to a computer 36 which contains a comparator 37 (step 130). The computer 36 extracts the serial number from the tag information or obtains the serial number from the interrogator output signal (step 132). For this example, the identification information stored in the IC memory is referred to as the tag's "serial number." The computer 36 accesses the database 200 and, using the comparator 37, searches through the database for a serial number 204 which matches the serial number of the interrogated tag 10 (step 134). If no match is found, the computer 36 outputs a "no action" signal. If the EAS system operates in a retail environment, the likely explanation when no match occurs is that the tag 10 is similar in kind to those used by the store that the customer is exiting from, but belongs to an article associated with a different store, or different chain of stores. Thus, that particular tag 10 may exist in a different database than the one accessed for the particular store. The store can thus assume that the article is not being improperly removed therefrom. Of course, there is a possibility that the article belongs to the particular store, but that nobody entered it into the database 200 when it was received into inventory. The present system cannot detect such human errors. However, a log may be kept of tags 10 which are read, but not found in the database 200, so that errors like this can be tracked if other inventory control procedures detect shortfalls at a later date.

Still referring to FIGS. 9 and 11, if the serial number is found in the database 200, the computer 36 extracts the status bits from the read tag 10 (step 138), and uses the status bits to decide whether the article may be removed from the premises (in the case of a retail article or borrowed article) or accessed (in the case of an on-site use) (step 140). This step is performed by comparing the read status bits to a predefined table of status bits maintained in a separate portion of the database 200, or in a separate memory (not shown). A sample table for a two bit status code in a retail environment may be as follows:

00—SOLD
01—UNSOLD
10—RETURNED
11—RESOLD

A sample table for a one bit status code in a library or rental environment may be as follows:

0—CHECKED IN or REMOVAL PERMITTED
1—CHECKED OUT or REMOVAL NOT PERMITTED

If removal or accessing is permitted, a "no action" signal is output by the computer 36 (step 136). For example, if the status bits in the read tag 10 indicate that a retail article was sold (code=00), the customer is free to exit the store with the article. Likewise, if the status bits in the read tag 10 indicate that a videotape was properly checked out by a renter (code=1), the customer is free to exit the store with the videotape. If removal or accessing is not permitted, as in the case of an unsold article (code=01) or an article which is not properly checked out (code=0), an "action" signal is output from the computer 36 (step 142). The "action" signal may trigger an alarm which is audible or visible to either a customer or employee. Alternatively, or in addition to an alarm, other action may be taken, such as capturing an image of the detection zone.

The flowchart in FIG. 10 is used for EAS systems which rely upon virtual deactivation of tags 10. Referring to FIG. 10, the first four steps of reading tag information, extracting a serial number therefrom, matching the serial number to a serial number in the database 200, and outputting a "no action" signal if no match is found (steps 144, 146, 148, 150, are identical to steps 130, 132, 134, 136, respectively, of FIG. 9. The remaining steps in FIG. 10 differ from those in FIG. 9. If the serial number is located in the database 200, the status bits 206 of the associated serial number are retrieved from the database 200 (step 152). The status bits 206 are compared to a predefined table of status bits to determine whether the article may be removed from the premises or whether access to the article is permitted (step 154). Step 154 is thus similar to step 140 in FIG. 9, except that the status bits examined in FIG. 10 are the status bits 206 in the database 200, whereas the status bits examined in FIG. 9 are the status bits in the tag 10. The remaining step in FIG. 10 of outputting either a "no action" or "action" signal depending upon the result of the comparison (step 156) is the same as step 142 of FIG. 9.

FIGS. 12–15 illustrate a second embodiment of the present invention. The second embodiment differs from the first embodiment in one significant way. In the first embodiment, the serial number and status bits are read out of the tag 10 and are processed as separate pieces of information. In the second embodiment, there are no separate status bits. Instead, a portion of the serial number is used to perform some of the functions performed by the status bits of the first embodiment, and the article status field is used to perform other functions.

Figure 12:
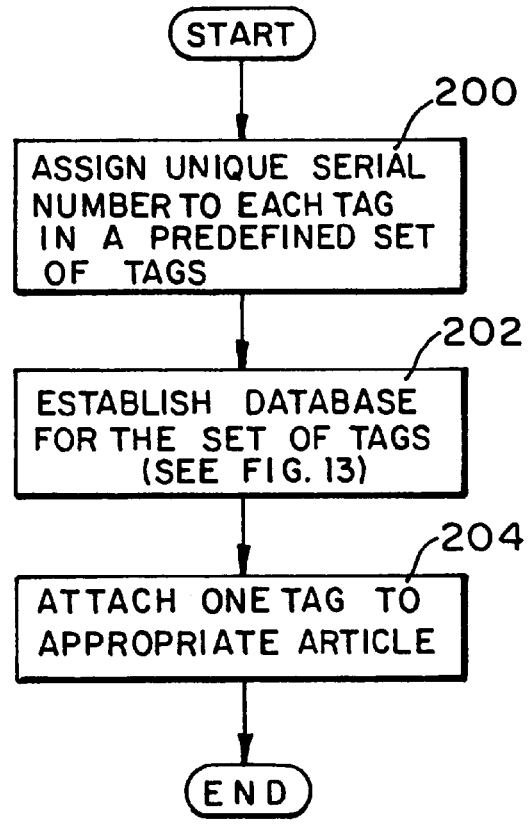
FIG. 12 is a flowchart of the steps for initiating a second embodiment of the present invention.
Figure 13:
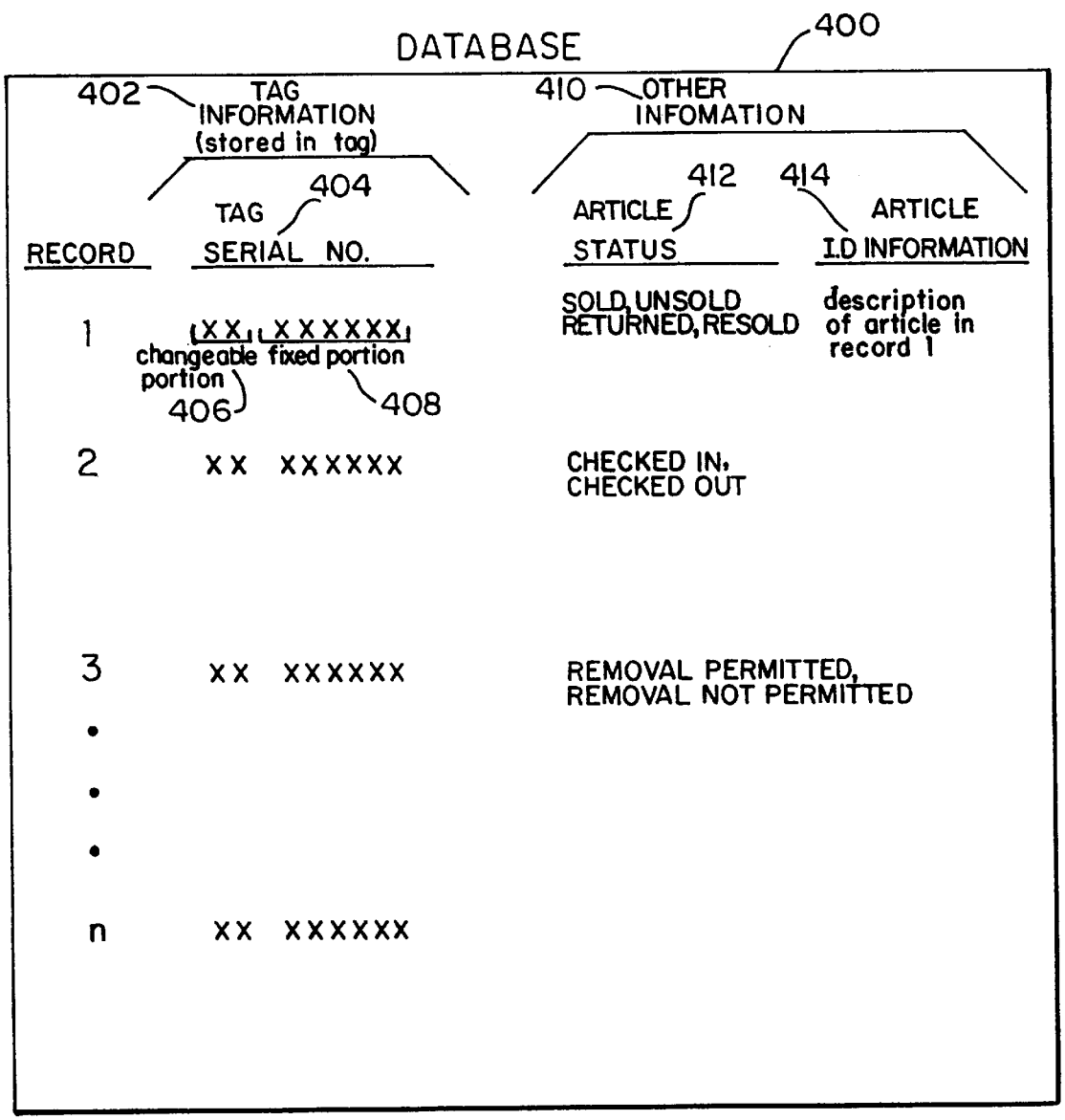
FIG. 13 is a sample database created for use with the second embodiment of the present invention.

FIG. 12 is a flowchart of the steps for initiating a second embodiment of the present invention, and FIG. 13 is a sample database created for use with the second embodiment. Referring to FIG. 12, a predefined set of tags 10 are prepared to be applied to a predefined set of articles (not shown), unique tag information is assigned to each tag 10 and the tags are programmed accordingly (step 200). Next, a database is established for the set of tags 10 (step 202). Lastly, the tags 10 are attached directly to each article or to the packaging of each article (step 204). In the disclosed embodiment, one tag 10 is associated with each article. The steps in FIG. 12 may be performed in any order.

FIG. 13 shows a sample database 400 established in step 202 of FIG. 12. Each record in the database 400 includes a field for tag information 402 comprising a tag serial number 404. The serial number 404 includes a variable or changeable portion 406 of one or more bits and a fixed portion 408 of a plurality of bits. Each record in the database 400 may optionally includes a field for other information 410 pertaining to the record, such as article status 412 and article identification information 414. The tag serial number 404 is stored in the tag 10. Optionally, some or all of the other information 408 is also stored in the tag 10. Preferably, each serial number 404 is unique. In this manner, there is no chance that a tag used by the same or another entity (e.g., another chain of stores) can be confused with one another.

The article status 412 and article identification information 414 are the same as in the first embodiment of the invention.

Once all of the articles are tagged and the database 400 is established, the articles are made accessible to customers or patrons within predefined surroundings. The predefined surroundings have one or more exits with detection zones monitored by the interrogator 22 in the same manner as in the first embodiment.

Figure 14:
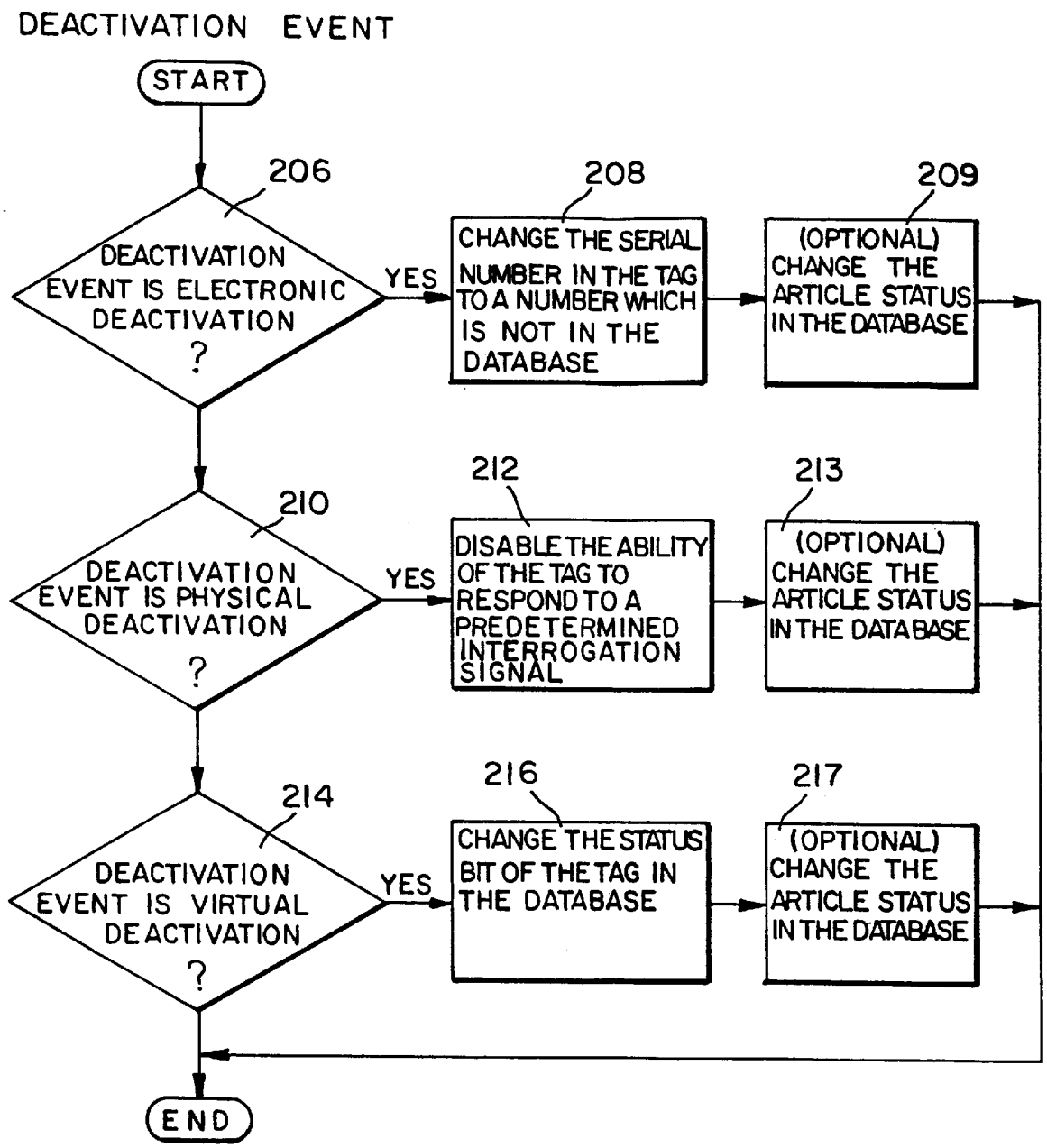
FIG. 14 is a flowchart of deactivation event options of "electronic deactivation," "physical deactivation," or "virtual deactivation," in accordance with the second embodiment of the present invention.

When legitimate access is obtained to an article having a tag associated therewith, the article is deactivated before it can be removed from the predefined surroundings. FIG. 14 is a flowchart showing the various options associated with this deactivation event. As in the first embodiment, deactivation may be either "electronic," "physical," or "virtual." Physical deactivation in the second embodiment is the same as physical deactivation in the first embodiment. However, electronic and virtual deactivation in the second embodiment differ from the first embodiment in some respects, as described below:

electronic deactivation—the serial number in the tag 10 is electronically changed or reprogrammed. Also, the article status 412 is changed in the database 400 (step 209), if such a field exists. The new serial number in the tag 10 is a number which is not in the database 400, and which preferably is not in any other databases of tags 10 of similar construction. The serial number in the tag 10 is changed by altering the changeable portion thereof. For example, in the retail environment example described above, an initial serial number of 01234567 would be changed to 00234567 upon sale of the tagged article. The electronic change can take place at the cash register or at a merchandise pick-up area. If the article is subsequently returned by the customer, the store would either change the serial number to 10234567 until the article is further processed, or would change the serial number back to 01234567 if the article is immediately reshelved for subsequent purchase.

physical deactivation—same as physical deactivation in the first embodiment (steps 210, 212, 213 of FIG. 14).

virtual deactivation—the changeable portion 406 of the tag serial number 404 is changed in the database 400, but no change is made to any part of the serial number in the tag 10 (steps 214, 216). Also, the article status 412 is changed in the database 400 (step 217), if such a field exists.

Tags 10 tray also be reactivated in the second embodiment of the invention by reversing the steps performed during deactivation. The decision process for a reactivation event is similar to the decision process of the first embodiment shown in FIG. 8, except for the previously highlighted differences regarding how tag information is changed.

Figure 15:
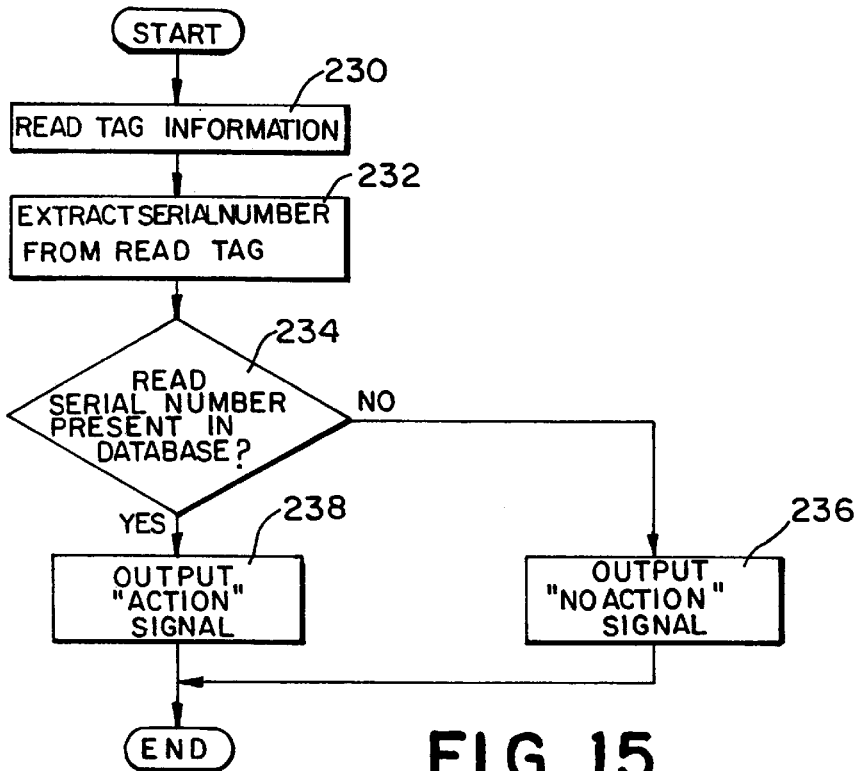
FIG. 15 is a flowchart of an exit interrogation/tag interrogation procedure useful for EAS systems which use electronic or virtual deactivation in accordance with the second embodiment of the present invention.

FIG. 15 is a flowchart of an exit interrogation/tag interrogation procedure useful for EAS systems which use electronic or virtual deactivation in accordance with the second embodiment of the invention. (As noted above, if an EAS system uses physical deactivation, the tag 10 will not respond to an interrogation signal. Thus, the procedures in FIG. 15 cannot be used for deactivated tags.) The interrogator 22 of the schematic block diagram in FIG. 11 is also used to perform the steps in FIG. 15.

Referring to FIGS. 11 and 15, as the tagged article enters the detection zone, the article's tag 10 outputs a signal in response to an interrogation signal from the interrogator 22. Next, the interrogator 22 outputs a signal which contains the tag information, and sends it to a computer 36 (step 230). The computer 36 extracts the tag's serial number from the tag information (step 232). The computer 36 accesses the database 400 and searches through the database for a serial number 404 which matches the serial number of the interrogated tag 10 (step 234). If no match is found, the computer 36 outputs a "no action" signal (step 236).

If the EAS system operates in a retail environment and uses electronic deactivation, the most likely explanations when no match occurs are:

(a) the tag 10 belongs to an article purchased at the present store, but the serial number in the tag 10 was electronically altered upon purchase of the article; or (b) the tag 10 is similar in kind to those used by the store that the customer is exiting from, but belongs to an article associated with a different store, or different chain of stores. Thus, that particular tag 10 may exist in a different database than the one accessed for the particular store.

In both instances, the store can assume that the article is not being improperly removed. As discussed in the first embodiment of the invention, there is a possibility that the article belongs to the particular store, but that nobody entered it into the database 400 when it was received into inventory. The present system cannot detect such human errors. However, a log may be kept of tags 10 which are read, but not found in the database 400, so that errors like this can be tracked if other inventory control procedures detect shortfalls at a later date.

Still referring to FIGS. 11 and 15, if the serial number is found in the database 400, the computer 36 outputs an "action" signal (step 238). The "action" signal may trigger an alarm which is audible or visible to either a customer or employee. Alternatively, or in addition to an alarm, other action may be taken, such as capturing an image of the detection zone. The most likely explanations for when a read serial number matches a serial number in the database 400 are as follows:

(a) a customer or patron is improperly attempting to remove an article from the premises; or (b) an employee did not properly electronically deactivate the tag 10 of the article.

In either instance, the "action" signal alerts the appropriate person to investigate the matter further.

The flowchart in FIG. 15 may also be used for EAS systems which rely upon virtual deactivation of tags 10. If the EAS system operates in a retail environment and uses virtual deactivation, the most likely explanations when no match occurs are:

(a) the tag 10 belongs to an article purchased at the present store, but the serial number 404 of the tag 10 in the database 400 was changed upon purchase of the article; or (b) the tag 10 is similar in kind to those used by the store that the customer is exiting from, but belongs to an article associated with a different store, or different chain of stores. Thus, that particular tag 10 may exist in a different database than the one accessed for the particular store.

In both instances, the store can assume that the article is not being improperly removed.

The most likely explanations for a read serial number to match a serial number in the database 400 are as follows:

(a) a customer or patron is improperly attempting to remove an article from the premises; or (b) an employee did not properly virtually deactivate the tag 10 of the article (i.e., the employee did not change the serial number 404 in the database 400 upon purchase of the article.)

In either instance, the "action" signal alerts the appropriate person to investigate the matter further.

The main difference between the electronic and virtual deactivation schemes is that the electronic deactivation scheme requires the use of equipment which can electronically alter the serial number in the tag, whereas the virtual deactivation scheme requires only that the serial number 404 in the database 400 be changed. Once the tagged article is read, the virtual deactivation scheme may thus be executed entirely in software.

An alternative version of the electronic deactivation scheme in the second embodiment of the invention is to change the article status 412 in the database upon an appropriate event (e.g., purchase of a tagged article), as well as the serial number 404 in the database. The serial number 404 is changed by altering the changeable portion 406 in the same manner as the security tag 10. In this alternative embodiment, all interrogated security tags 10 which are originally logged into the database 400 will match during the interrogation scheme. An additional step would then be required to examine the article status 412 to determine whether removal is permitted. In this alternative embodiment, the only tags 10 which will not cause a match are those which belong to other stores, or chains of stores, and which are thus not present in the database 400 of the present store or chain of stores.

An alternative version of the virtual deactivation scheme in the second embodiment of the invention is to change the article status 412 in the database 400 upon an appropriate event (e.g., purchase of a tagged article), instead of changing the serial number 404 in the database 400. In this alternative embodiment, all interrogated tags 10 which are originally logged into the database 400 will match during the exit interrogation scheme. An additional step would then be required to examine the article status 412 to determine whether removal is permitted. In this alternative embodiment, the only tags 10 which will not cause a match are those which belong to other stores, or chains of stores, and which are thus not present in the database 400 of the present store or chain of stores.

In both embodiments of the invention, a common coding bit scheme should be adopted by all users of the same type of tag 10 to avoid conflicts among different databases. For example, the scheme in FIG. 4 allows for changes to be made to the status bits, whereas the tag identification information (e.g., serial number) is permanently fixed. Likewise, the scheme of FIG. 13 allows for changes to be made to the first two digits of the serial number, whereas the remaining six digits are permanently fixed. Thus, in the scheme of FIG. 4, the tag identification information of all tags 10 should be unique, and in the scheme of FIG. 13, the last six digits of all tag serial numbers should be unique. If these rules are followed, no conflicts will arise between EAS systems of different entities. For example, if a customer walks out of a SEARS store with a properly deactivated tagged article, carries the tagged article into neighboring stores that use the same EAS system as the SEARS store, and exits the neighboring stores carrying the tagged article purchased at SEARS, the databases in the neighboring stores will not contain any serial numbers that match the SEARS article. Accordingly, none of the computers in the neighboring stores will output an "action" signal upon detection of the article in their interrogation zones.

An eight bit serial number is used to illustrate the principles of the present invention. In a practical commercialized system, the total number of bits will be much greater than eight to allow for a large number of articles from a plurality of entities (e.g., individual stores, chains of stores, libraries, etc.) to be uniquely tagged. For example, the IC 18 stores 20 bits of data.

Figure 16:
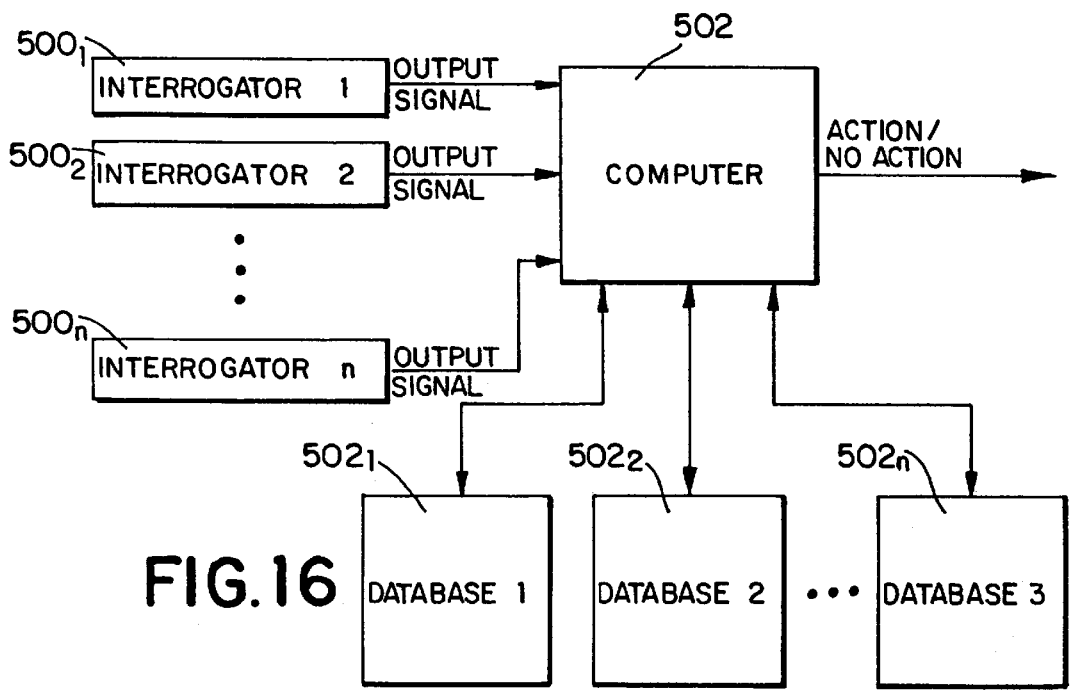
FIG. 16 is a schematic block diagram of large scale application of the present invention which links together plural entities.

FIG. 16 is a schematic block diagram of a large-scale application of the present invention which allows plural entities to detect unauthorized removal or access of articles from any of each other's premises. For example, a large shopping complex may have hundreds of individual stores, each of which use the same EAS system and the same type of tag 10. If a shoplifter successfully defeats the EAS system of one store by somehow removing a tagged, non-deactivated article from the store, the shoplifter may freely walk into and out of other stores carrying the stolen article without triggering an alarm at the interrogators of the other stores. While the interrogators of the other stores will detect the stolen tagged article, the article will not trigger an alarm because it does not appear in the database of the other stores. In the system of FIG. 16, each store has an interrogator $500_1$, $500_2$, . . . , $500_n$, and a database $502_1$, $502_2$, . . . , $502_n$, of articles in its inventory. Each of the interrogators $500_1$, $500_2$, . . . , $500_n$ and the databases $502_1$, $502_2$, . . . , $502_n$ are connected to a central computer 504. Whenever a tagged article is detected, the central computer 504 checks all of the databases to determine whether the article has been properly removed from wherever it originated. If a stolen article is detected, appropriate action may then be taken by security personnel affiliated with the shopping complex and the victimized store. The interrogators and the databases of the individual stores communicate with the computer 504 by any suitable wired or wireless electronic means.

Referring to FIGS. 11 and 16, the signal output from the interrogator 22 (i.e., the tag information) contains the serial number. As described above, the computers in these figures extract the serial number from the tag information and interact with respective databases. Serial number "extraction" may be required if the interrogator output includes other information, or if the tag information includes other information that is passed to the interrogator output. However, it should be understood that the serial number need not necessarily be "extracted from" the interrogator output since the interrogator output may provide only the serial number, or the interrogator itself may extract the serial number from the tag information. If this is the case, the computer merely transfers the serial number directly from its input to a database query.

Figure 17:
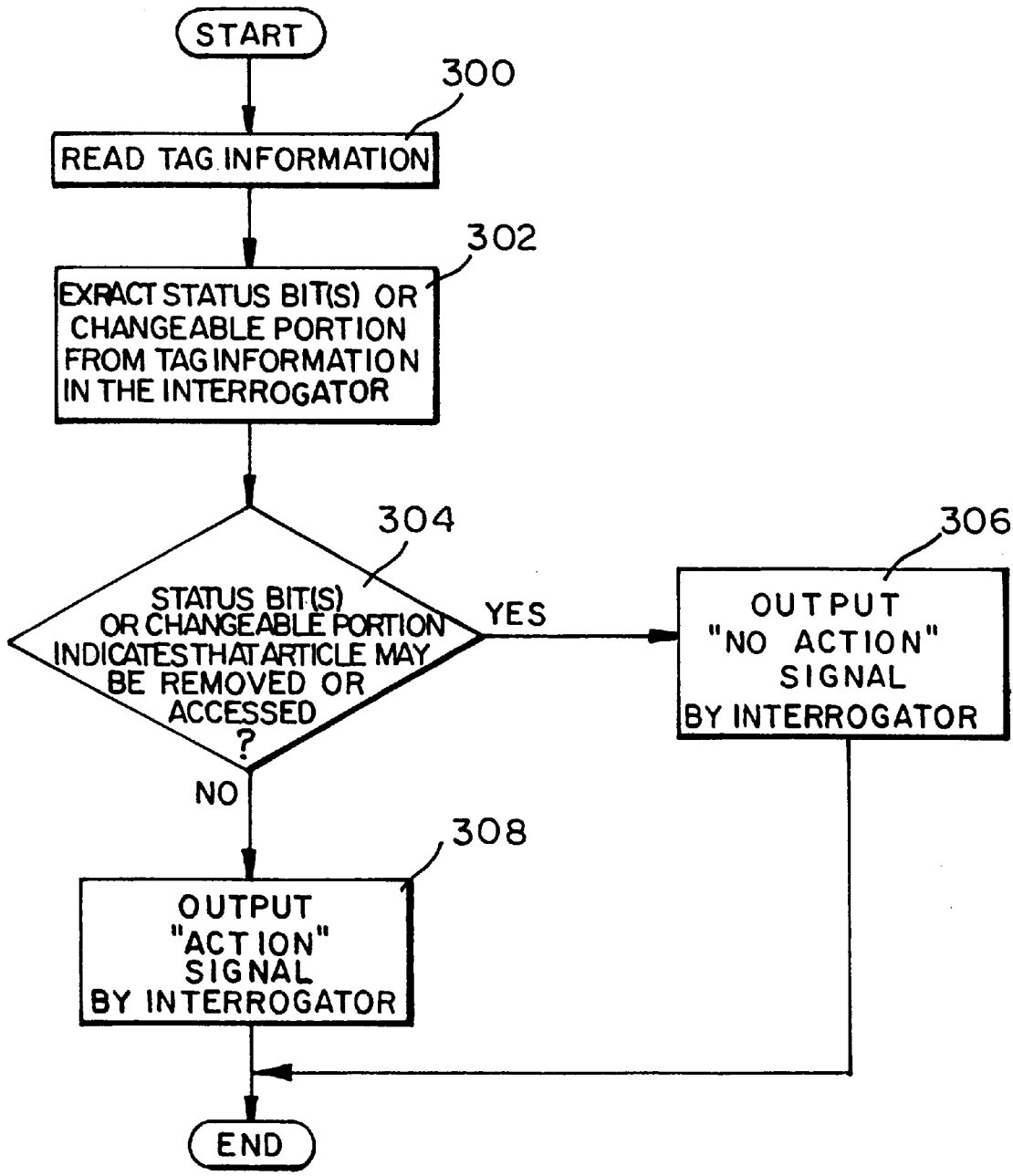
FIG. 17 is a flowchart of an exit interrogation/tag interrogation procedure useful for EAS systems which use electronic deactivation in accordance with a third embodiment of the present invention.

FIG. 17 is a flowchart of an exit interrogation/tag interrogation procedure useful for EAS systems which use electronic deactivation in accordance with a third embodiment of the present invention. This embodiment of the invention does not require accessing a database to obtain the article status information. Instead, the interrogator extracts or detects the electronically alterable portion of the tag information and determines an appropriate response therefrom.

Referring to FIG. 17, the interrogator 22 reads the tag information 202 or 402 (step 300). Next, the interrogator 22 extracts the status bit(s) 206 from the tag information 202 or extracts the bits of the changeable portion 406 from the tag information 402 (step 302). The status bit(s) 206 or the bits of the changeable portion 406 are examined and a determination is made as to whether the tagged article may be removed or accessed (step 304). This step is similar to step 140 of FIG. 9. If the output of the decision block in step 304 is YES, then a "no action" signal is output by the interrogator 22 (step 306). If the output of the decision block in step 304 is NO, then an "action" signal is output by the interrogator 22 (step 308). Thus, steps 306 and 308 are similar to steps 136 and 142 of FIG. 9. The "action" signal may trigger an alarm which is audible or visible to either a customer or employee. Alternatively, or in addition to an alarm, other action may be taken, such as capturing an image of the detection zone.]

The scheme in FIG. 17 is simpler than the scheme in FIG. 9 which requires accessing a database. The scheme in FIG.

9 includes a precheck of the serial number in the database to determine whether the status of the tagged article needs to be examined any further (see step 134). However, as noted above, there is a possibility that the tagged article belongs to the particular store or entity, but that nobody entered it into the database when it was received into inventory. The scheme in FIG. 9 may log this event, but will not further examine the status bits to determine if the tagged article may be removed or accessed. In contrast, since there is no such precheck in the scheme of FIG. 17, the status of all tagged articles will be checked, including articles which were not properly inventoried, as well as articles from other stores or entities which use tags of the same type and resonant frequency.

The tag status bit(s) 206 and the changeable portion 406 of the tag serial number 404 may be located at any position within the tag information. The locations shown in respective FIGS. 4 and 13 need not match the actual location within the tag.

One advantage of virtual deactivation is that access to the tagged article is not required to perform the deactivation. That is, the article need not be physically present. It is only necessary to obtain valid access to the database to virtually deactivate the tag.

Virtual deactivation may be used for removal of tagged articles from a secure area, wherein like tagged articles have the same serial number, and the tagged articles are carried out of a secure area past an interrogator. Consider a secure area such as a store, tool cage, repair shop, or the like. A customer or worker enters the secure area to select a plurality of articles for removal, such as a plurality of merchandise items to be purchased, or a plurality of tools required for performing a repair task. A computer is used to enter the plurality of articles, either individually, or by a job or lot number, and the computer keeps a record of the entered articles. For example, one job or lot number may represent a plurality of articles required for a particular repair task. The tag database is updated to virtually deactivate the plurality of articles. The customer or worker may now walk through the interrogation zone carrying all of the articles without triggering an alarm. After the customer or worker exits the secure area, the virtually deactivated articles are reactivated so that the next user cannot exit with the same articles unless that user also has them entered into the computer. One advantage of this scheme is that since identical articles are provided with an identical tag, the time and expense associated with tagging articles is reduced.

Virtual and electronic deactivation may also be used to set up multi-level complex security states which provide different types of alarms depending on information obtained from plural databases. Thus, the decision to trigger an alarm need not be simply "yes" or "no." Likewise, different types of alarms may be triggered depending upon database information.

Consider a secure area which has a plurality of different zones, such as a sports stadium. A tagged article, or a person carrying a tagged badge may be permitted to enter only specific zones based on information stored in the database. To carry out such an embodiment, the interrogators which monitor each zone must provide location information to the database along with the tag information (e.g., "I am an interrogator for women's locker room2. Is serial number 12345678 permitted access to this room?"). The database or databases in such a system will have more fields than those shown in FIGS. 4 and 13 to accommodate the additional information. Furthermore, if access is not permitted, there may not necessarily be a visual or audible alarm at the entrance to the zone. Instead, the database may be programmed to send out a silent alarm to a monitoring station, or to remotely notify a predetermined party that a particular article or person is now in a restricted zone. Additional databases may be linked to the tag database to provide such auxiliary functions.

A system which uses virtual deactivation provides significant advantages over prior art resonant tag systems. For example, virtual deactivation minimizes false alarms because only verified serial numbers trigger an alarm. Environmental resonances and RF devices may interfere with tag readings, but cannot generate the sequences needed to create a bona fide serial number at the interrogator. Thus, unless a human error has been made in the database, false alarms will be rare. Since false alarms are minimized, the RFID tags may be permanently embedded in products, rather than being removably affixed to the article or its packaging. This saves time and effort by store personnel and improves overall security.

Furthermore, if the RFID tag is used for article sensing, such as at a point-of-sale terminal, virtual deactivation may be automatically performed by sending an output signal from the article sensor/reader to the tag database. Also, as noted above, the RFID tag need not be read or sensed to perform deactivation. Thus, the status of articles in inventory, or the like, may be altered without requiring physical access to the articles.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. An electronic security system comprising:
 (a) a predefined set of passive radio frequency identification tags, each tag being associated with, and attached to, an article or packaging for an article, each tag including:
  (i) an antenna for detecting the presence of the article by receiving an interrogation signal and returning a response signal, and
  (ii) an integrated circuit connected to the antenna for storing tag information and for outputting the tag information with the response signal upon interrogation of the tag, the tag being programmed with unique tag information so that no two tags within the predefined set of passive tags have exactly the same tag information;
 (b) an interrogator for monitoring a detection zone for detecting disturbances in the form of a response signal caused by the presence of a tag within the zone, the interrogator outputting an interrogator output signal when a tag is detected in the zone, each interrogator output signal including the tag information stored in the integrated circuit;
 (c) a computerized database containing a record for each of the tags in the set, each record including the tag information;
 (d) a computer including a comparator for receiving the database records and the tag information from the interrogator and comparing the tag information to the database records, and outputting an appropriate response,
 wherein a portion of the tag information in the database is variable information which is changed in the database without any physical or electronic altering of the tag or the tag information stored in the integrated circuit, the change in the database thereby causing a virtual deactivation of the tag.

2. A system according to claim 1 wherein the variable information is one or more status bits which indicate the status of the tagged article.

3. A system according to claim 1 wherein the tag information comprises a tag serial number and the variable information is a changeable portion of the serial number.

4. A system according to claim 1 wherein each database record includes article identification information.

5. A system according to claim 1 wherein the response output from the comparator includes the following responses:
   (i) a response indicating that legitimate access to the article is permitted, or
   (ii) a response indicating that legitimate access to the article is not permitted, or
   (iii) a response that no article having the detected tag information exists in the database.

6. A system according to claim 1 wherein the tag information indicates that the article associated with the tag is either sold or unsold, or checked in or checked out.

7. A system according to claim 1 wherein the tag information indicates whether or not the article associated with the tag may be removed from a facility.

8. An electronic security system comprising:
   (a) a predefined set of passive radio frequency identification tags, each tag being associated with, and attached to, an article or packaging for an article, each tag including:
      (i) an antenna for detecting the presence of the article by receiving an interrogation signal and returning a response signal, and
      (ii) an integrated circuit connected to the antenna for storing tag information and for outputting the tag information with the response signal upon interrogation of the tag, the tag being programmed with unique tag information so that no two tags within the predefined set of passive tags have exactly the same tag information;
   (b) an interrogator for monitoring a detection zone for detecting disturbances in the form of a response signal caused by the presence of a tag within the zone, the interrogator outputting an interrogator output signal when a tag is detected in the zone, each interrogator output signal including the tag information stored in the integrated circuit;
   (c) a computerized database containing a record for each of the tags in the set, each record including the tag information;
   d) a computer including a comparator for receiving the database records and the tag information from the interrogator and comparing the tag information to the database records, and outputting an appropriate response,
   wherein each record in the database further includes changeable article status information, and wherein virtual deactivation of a tag is performed by changing the article status in the database, but not physically or electronically altering the tag or the tag information stored in the integrated circuit.

9. A method of using a predefined set of passive radio frequency identification tags in an electronic security system, each tag being associated with, and attached to, an article or packaging for an article, each tag including (i) an antenna for detecting the presence of the article by receiving an interrogation signal and returning a response signal, and (ii) an integrated circuit connected to the antenna for storing tag information and for outputting the tag information with the response signal upon interrogation of the tag, the method comprising the steps of:
   (a) programming each of the tags with unique tag information so that no two tags within the predefined set of passive tags have exactly the same tag information;
   (b) establishing a computerized database containing a record for each of the tags in the set, each record including the tag information;
   (c) monitoring a detection zone with an interrogator for detecting disturbances in the form of a response signal caused by the presence of a tag within the zone, the interrogator outputting an interrogator output signal when a tag is detected in the zone, each interrogator output signal including the tag information stored in the integrated circuit;
   (d) comparing the database records to the tag information, and outputting an appropriate database response; and
   (e) performing a deactivation event on a tag when obtaining legitimate access to the article having the tag associated therewith, wherein the step of performing a deactivation event includes virtually deactivating the tag by changing at least a portion of the tag information in the database, but not physically or electronically altering the tag or the tag information stored in the integrated circuit.

10. A method according to claim 9 further comprising the step of:
   (f) virtually reactivating a tag which was previously virtually deactivated by changing the portion of the tag information in the database which was changed for virtual deactivation to recreate the original tag information stored in the database, but not physically or electronically altering the tag or the tag information stored in the integrated circuit.

11. A method according to claim 9 wherein step (b) includes providing each database record with article identification information.

12. A method according to claim 9 wherein the database response includes one of the following responses:
   (i) a response indicating that legitimate access to the article is permitted, or
   (ii) a response indicating that legitimate access to the article is not permitted, or
   (iii) a response that no article having the detected tag information exists in the database.

13. A method according to claim 9 wherein the tag information indicates that the article associated with the tag is sold or unsold.

14. A method according to claim 9 wherein the tag information indicates that the article associated with the tag has been checked in or checked out.

15. A method according to claim 9 wherein the tag information indicates whether or not the article associated with the tag may be removed from a facility.

16. A method of using a predefined set of passive radio frequency identification tags in an electronic security system, each tag being associated with, and attached to, an article or packaging for an article, each tag including (i) an antenna for detecting the presence of the article by receiving an interrogation signal and returning a response signal, and (ii) an integrated circuit connected to the antenna for storing tag information and for outputting the tag information with the response signal upon interrogation of the tag, the method comprising the steps of:

(a) programming each of the tags with unique tag information so that no two tags within the predefined set of passive tags have exactly the same tag information;

(b) establishing a computerized database containing a record for each of the tags in the set, each record including the tag information;

(c) monitoring a detection zone with an interrogator for detecting disturbances in the form of a response signal caused by the presence of a tag within the zone, the interrogator outputting an interrogator output signal when a tag is detected in the zone, each interrogator output signal including the tag information stored in the integrated circuit;

(d) comparing the database records to the tag information, and outputting an appropriate database response; and (e) performing a deactivation event on a tag when obtaining legitimate access to the article having the tag associated therewith, wherein each record in the database further includes article status information, and the step of performing a deactivation event includes virtually deactivating the tag by changing the article status in the database, but not physically or electronically altering the tag or the tag information stored in the integrated circuit.

17. A method according to claim 16 further comprising the step of:

(f) virtually reactivating a tag which was previously virtually deactivated by changing the article status information in the database which was changed for virtual deactivation to recreate the original article status information stored in the database, but not physically or electronically altering the tag or the tag information stored in the integrated circuit.

18. A method of using a predefined set of passive radio frequency identification tags in an electronic security system, each tag being associated with, and attached to, an article or packaging for an article, each tag including (i) an antenna for detecting the presence of the article by receiving an interrogation signal and returning a response signal, and (ii) an integrated circuit connected to the antenna for storing tag information and for outputting the tag information with the response signal upon interrogation of the tag, the method comprising the steps of:

(a) programming each of the tags with unique tag information so that no two tags within the predefined set of passive tags have exactly the same tag information, wherein the tags are programmed with unique tag information including a tag serial number having a changeable portion and a fixed portion;

(b) establishing a computerized database containing a record for each of the tags in the set, each record including the tag information;

(c) monitoring a detection zone with an interrogator for detecting disturbances in the form of a response signal caused by the presence of a tag within the zone, the interrogator outputting an interrogator output signal when a tag is detected in the zone, each interrogator output signal including the tag information stored in the integrated circuit;

(d) comparing the database records to the tag information, and outputting an appropriate database response; and (e) virtually deactivating the tag when obtaining legitimate access to the article having the tag associated therewith by changing the changeable portion of the serial number in the database, but not physically or electronically altering the tag or the tag serial number stored in the integrated circuit.

19. A method of using a predefined set of passive radio frequency identification tags in an electronic security system, each tag being associated with, and attached to, an article or packaging for an article, each tag including (i) an antenna for detecting the presence of the article by receiving an interrogation signal and returning a response signal, and (ii) an integrated circuit connected to the antenna for storing tag information and for outputting the tag information with the response signal upon interrogation of the tag, the method comprising the steps of:

(a) programming each of the tags with unique tag information so that no two tags within the predefined set of passive tags have exactly the same tag information, wherein the tags are programmed with unique tag information including a tag serial number and one or more status bits representing the status of the article having the tag associated therewith;

(b) establishing a computerized database containing a record for each of the tags in the set, each record including the tag information;

(c) monitoring a detection zone with an interrogator for detecting disturbances in the form of a response signal caused by the presence of a tag within the zone, the interrogator outputting an interrogator output signal when a tag is detected in the zone, each interrogator output signal including the tag information stored in the integrated circuit;

(d) comparing the database records to the tag information, and outputting an appropriate database response; and (e) virtually deactivating the tag when obtaining legitimate access to the article having the tag associated therewith by changing one or more of the status bits in the database, but not physically or electronically altering the tag, the tag serial number, or the status bits stored in the integrated circuit.

20. An electronic security system for a plurality of entities, each tag being associated with, and attached to, an article or packaging for an article associated with one of the entities, the system comprising:

(a) a predefined set of passive radio frequency identification tags, each tag including:

(i) an antenna for detecting the presence of the article by receiving an interrogation signal and returning a response signal, and (ii) an integrated circuit connected to the antenna for storing tag information and for outputting the tag information with the response signal upon interrogation of the tag, each tag being programmed with unique tag information so that no two tags within the predefined set of passive tags have exactly the same tag information;

(b) a plurality of interrogators, each interrogator monitoring a detection zone of one of the entities for detecting disturbances in the form of a response signal caused by the presence of a tag within the zone, the interrogator outputting an interrogator output signal when a tag is detected in the zone, each interrogator output signal including the tag information stored in the integrated circuit;

(c) a computerized database containing a record for each of the tags in the set, each record including the tag information; and (d) a computer including a comparator for receiving the database records and the tag information from the plurality of interrogators and comparing the tag information to the database records, and outputting an appropriate response, wherein a portion of the tag information in the database is variable information which is changed in the database without any physical or electronic altering of the tag or the tag information stored in the integrated circuit, the change in the database thereby causing a virtual deactivation of the tag.

21. A system according to claim 20, wherein the computerized database includes a plurality of individual databases, each database storing records for tags associated with articles for a respective entity.

22. A radio frequency identification tag comprising:
(a) an antenna for receiving an interrogation signal and returning a response signal; and
(b) an integrated circuit connected to the antenna for storing tag information and for outputting the tag information with the response signal upon interrogation of the tag, wherein the tag includes at least one circuit element that has a physically activated state which allows the tag to return a response signal, and a physically deactivated state which prevents the tag from returning a response signal, wherein the tag has a resonant circuit for receiving the interrogation signal and returning the response signal, wherein the integrated circuit is connected to the resonant circuit and the antenna is part of the resonant circuit, the resonant circuit of each tag including a capacitor connected in series with the antenna, the at least one circuit element being a reversible switch connected across either the capacitor or antenna, the activated and deactivated states depending upon the position of the reversible switch, the tag being physically deactivated by opening the reversible switch thereby preventing operation of the resonant circuit, and wherein the reversible switch is a field effect transistor having a charge storage mechanism associated with its gate electrode.

23. A radio frequency identification tag comprising:
(a) an antenna for receiving an interrogation signal and returning a response signal; and
(b) an integrated circuit connected to the antenna for storing tag information and for outputting the tag information with the response signal upon interrogation of the tag, wherein the tag includes at lease one circuit element that has a physically activated state which allows the tag to return a response signal, and a physically deactivated state which prevents the tag from returning a response signal, wherein the tag has a resonant circuit for receiving the interrogation signal and returning the response signal, wherein the tag has a resonant circuit for receiving the interrogation signal and returning the response signal, wherein the integrated circuit is connected to the resonant circuit and the antenna is part of the resonant circuit, the resonant circuit of each tag including a capacitor connected in series with the antenna, the at least one circuit element being a reversible switch connected between the integrated circuit and the antenna, the activated and deactivated states depending upon the position of the reversible switch, the tag being physically deactivated by opening the reversible switch, thereby disconnecting the antenna from the integrated circuit, and wherein the reversible switch is a field effect transistor having a charge storage mechanism associated with its gate electrode.

24. A radio frequency identification tag comprising:
(a) an antenna for receiving an interrogation signal and returning a response signal; and
(b) an integrated circuit connected to the antenna for storing tag information and for outputting the tag information with the response signal upon interrogation of the tag, wherein the tag includes at least one circuit element that has a physically activated state which allows the tag to return a response signal, and a physically deactivated state which prevents the tag from returning a response signal, wherein the tag has a resonant circuit for receiving the interrogation signal and returning the response signal, wherein the integrated circuit is connected to the resonant circuit and the antenna is part of the resonant circuit, the resonant circuit of each tag including a capacitor connected in series with the antenna, the at least one circuit element being a reversible switch connected in series with the capacitor and the antenna, the activated and deactivated states depending upon the position of the reversible switch, the tag being physically deactivated by opening the reversible switch, thereby disabling the resonant circuit, wherein the reversible switch is a field effect transistor having a charge storage mechanism associated with its gate electrode.

\* \* \* \* \*